Feb. 14, 1933.  J. L. BONANNO  1,897,749
REMOTE CONTROL SYSTEM
Filed Aug. 27, 1931
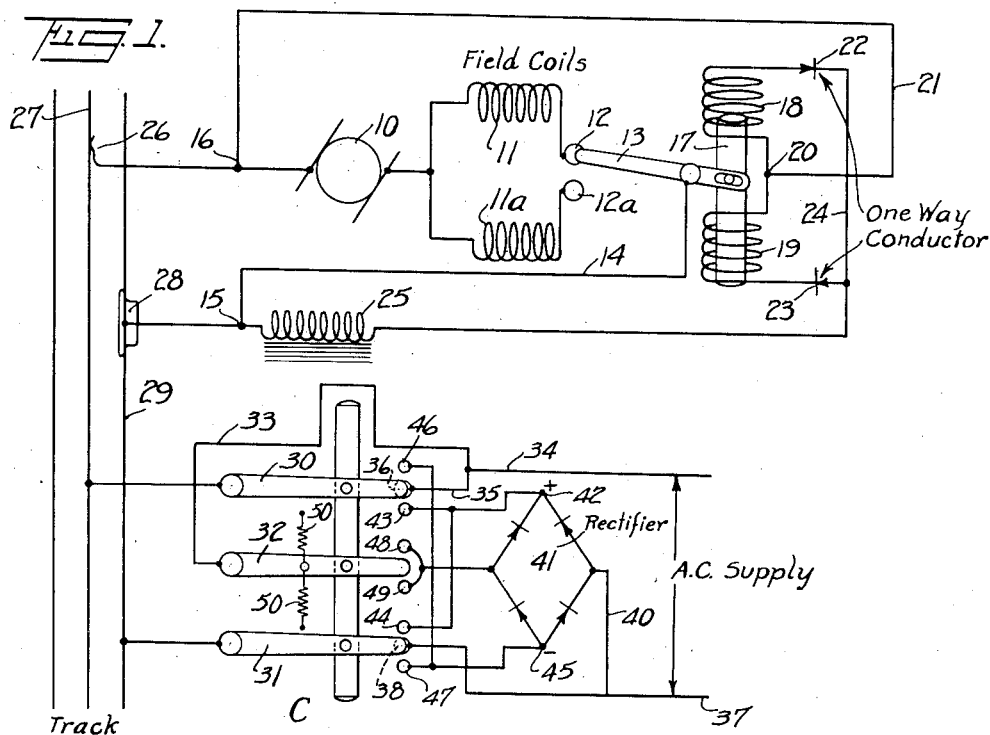
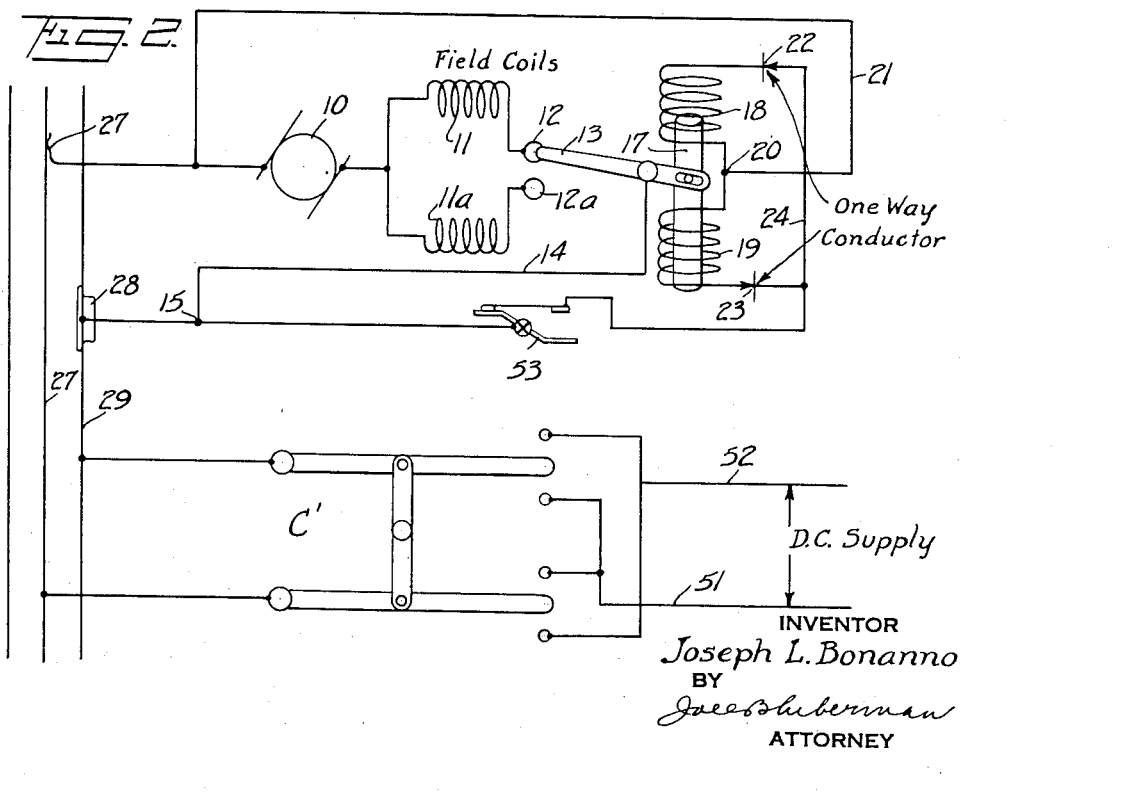
INVENTOR
Joseph L. Bonanno
BY
ATTORNEY Patented Feb. 14, 1933

1,897,749

UNITED STATES PATENT OFFICE

JOSEPH L. BONANNO, OF FOREST HILLS, NEW YORK, ASSIGNOR TO THE LIONEL CORPORATION, OF NEW YORK, N. Y., A CORPORATION OF NEW YORK

REMOTE CONTROL SYSTEM

Application filed August 27, 1931. Serial No. 559,608.

The present invention relates to remote control systems and is more particularly directed toward remote control systems designed for effecting the reversal of electrically operated motion translating devices, such as motors and polarized relays.

The present invention contemplates a remote control system of this nature for controlling either direct current or alternating current apparatus. Where alternating current apparatus is to be controlled, provisions are made for supplying alternating current for the normal operation of the apparatus and for providing rectified current from this alternating source for control purposes. During normal operation excessive current flow to the control devices that operate on direct or rectified current is avoided by designing the circuits to have high alternating current impedance. Reversing control is effected by selecting the polarity of the rectified current to be supplied to the control circuits, and these control circuits include one-way conductors so that the control circuits selectively operate.

Where direct current apparatus is to be controlled substantially the same system is employed except that the rectifier is omitted. Overheating of the control circuits may be avoided by employing a self closing circuit breaker in the control circuits which is actuated upon energization of the motor or relay and held open thereby.

The accompanying drawing shows, for purposes of illustrating the present invention, two of the many embodiments in which the invention may take form, it being understood that the drawing is illustrative of the invention rather than limiting the same. In the drawing:

Fig. 1 is a circuit diagram showing a form of control for an alternating current device, and Fig. 2 is a circuit diagram showing the control for a direct current device.

In the drawing the motor armature is indicated at 10 and field coils are indicated at 11 and 11a. These coils are wound reversely about the field structure and the direction of rotation depends upon which coil is energized. The terminal 12 or 12a for the corresponding field coil is connected by a switch blade 13 with a wire 14 which extends to one terminal 15 of the motor. The armature 10 is connected to the other terminal indicated at 16. The switch blade 13 is connected with an armature 17 carried within coils 18 and 19. A common point 20 between these coils is connected to terminal 16 of the motor by a wire indicated at 21. The other side of the coil 18 is connected to a one-way conductor 22 while the other terminal of the coil 19 is connected to a one-way conductor 23. These one-way conductors are connected together as indicated by a wire 24 and are then connected to a choke coil 25 with the other terminals 15 of the motor. The one-way conductors may be of the dry metallic type, and the direction of current flow is as indicated. The impedance of coils 18 and 19 may be made sufficiently high to render the use of a choke unnecessary.

The present remote control system is adaptable for controlling toy trains and when so used the parts so far described are carried in the toy locomotive. The terminal 16 may be connected to a current collector 26 adapted to contact with the third rail 27, while the terminal 15 is connected to a wheel 28 adapted to travel along the track rail 29.

The control switch for the motor or relay is indicated at C. In the form shown in Fig. 1 it is a triple-blade, triple-throw switch. Two of the blades 30 and 31 are permanently connected to the track circuit formed by the rails 27 and 29. The other blade 32 is permanently connected by a wire indicated at 33 with one side 34 of an alternating current-supply source. This side of the supply circuit is also connected by a wire 35 with a terminal 36 normally in engagement with the contact 30. The other side 37 of the alternating current supply circuit is permanently connected with a terminal 38 normally engaged by a blade 31.

When the parts are in the position shown in Fig. 1, alternating current will be supplied to the track circuit for motor operation.

The other side 37 of the alternating current source is connected by a wire 40 with a rectifier 41 of any desired type. The drawing indicates a four element bridge type rectifier. The output terminal 42 of the rectifier is connected to contacts 43 and 44 while the output terminal 45 of the rectifier is connected to contacts 46 and 47. The alternating current supply terminal of the rectifier is connected to contacts 48—49 as indicated.

The triple throw switch C is held in the normal, or indicated position, by opposed springs 50. When one actuates the switch to move the blades downwardly, a connection is made from the contacts 43—47 to the track circuit and from the contact 49 to the alternating current supply circuit so that rectified current of predetermined polarity is supplied to the track circuit. The direct current impulse passes through one or the other of the coils 18 or 19 of the control circuit so as to actuate the control switch. The one-way conductors permit current to flow into only one of the coils. This operation takes place quickly and without operating the motor.

As soon as the pressure is released, the alternating current circuit is restored and the motor operates in the direction for which the reversing switch has been set. When the control switch is moved in the other direction the circuit is through the contacts 46 and 44 and the direct current supply is of opposite polarity.

In the form shown in Fig. 2 the layout is substantially the same and the same reference characters are applied to common parts. Instead of using the alternating current supply, the direct current supply is indicated at 51 and 52. The control switch C' has a normal open circuit position, as indicated, and is movable to reversely connect the alternating current supply source to the track circuit. The motor control circuit operates in the same manner as above described. In order to prevent overheating of the coils 18 or 19 of the control circuit, a self-closing switch 53 is included in the circuit. This switch may be made the same as the switch 136 shown in Patent No. 1,766,329. Where the motor is to operate on either direct or alternating current, the field control switch 53 may be substituted for the choke 25, if desired.

The advantages of this system are that accidental reversal is impossible, and that the direction of motion is definitely associated with the respective push buttons, thus after a "button" has been depressed once, further use of this button will not cause the reversal of the motor.

It will be noted that the combination of the coils 18 and 19 with one-way conductors 22 and 23 is capable of effecting the same results as that of the well known polarized relay wherein a permanent magnet is used for differentiating between currents of different polarities. For this reason the system above described may be used wherever the polarized relay is employed. It is further understood that the present invention is not limited to controlling motors having two separate field coils such as illustrated in the drawing, for it may be applied to ordinary motors having a single field coil by using a more complicating reversing switch, such, for example, as shown in the patent above referred to.

It is obvious that the invention may be embodied in many forms and constructions and I wish it to be understood that the particular forms shown are but two of the many forms. Various modifications and changes being possible, I do not otherwise limit myself in any way with respect thereto.

What is claimed is:

1. The combination with a reversible electrically operated motion translating device, of means for effecting reversal thereof, comprising a pair of opposed solenoid coils, a common armature therefor, two circuits selectively controlled by the armature and each connected with the motion translating device to cause it to operate in one direction or the other, a one-way conductor connected to each coil and to a circuit supply line so that current may pass through one coil or the other depending upon the polarity of the current, a source of direct current, and a reversing switch interposed between the direct current source and the current supply line whereby current may be supplied to one or the other of the coils.

2. The combination with a reversible electrically operated motion translating device, of means for effecting reversal thereof, comprising a pair of opposed solenoid coils, a common armature therefor, two circuits selectively controlled by the armature and each connected with the motion translating device to cause it to operate in one direction or the other, a one-way conductor connected to each coil and to a circuit supply line so that current may pass through one coil or the other depending upon the polarity of the current, a source of alternating current, a rectifier connected thereto for delivering direct current, a reversing switch interposed between the direct current source and the current supply line whereby direct current may be supplied to one or the other of the coils, and spring means to disconnect the reversing switch from the rectifier and for connecting it to the alternating current source to the current supply line.

3. A motor having an armature, a field, and a reversing switch for effecting reversal of the motor, and operating means for the reversing switch comprising two solenoid coils acting on a common armature, a common connection between the coils and one terminal of the motor, and a connection between the other terminal of the motor and each coil, said latter mentioned connections each including a one-way conductor for admitting current of predetermined polarity to the corresponding coil whereby the motor may be reversed by reversal of direct current supplied to it.

4. A motor having an armature, a field, and a reversing switch for effecting reversal of the motor, and operating means for the reversing switch comprising two solenoid coils acting on a common armature, a common connection between the coils and one terminal of the motor, a connection between the other terminal of the motor and each coil, said latter mentioned connections each including a one-way conductor for admitting current of predetermined polarity to the corresponding coil whereby the motor may be reversed by reversal of direct current supplied to it, and a self closing switch in the circuit for said coils acted upon by the field of the motor for opening the coil circuit while the motor is energized.

5. A motor having an armature, a field, and a reversing switch for effecting reversal of the motor, and operating means for the reversing switch comprising two solenoid coils acting on a common armature, a common connection between the coils and one terminal of the motor, a connection between the other terminal of the motor and each coil, said latter mentioned connections each including a one-way conductor for admitting current of predetermined polarity to the corresponding coil whereby the motor may be reversed by reversal of direct current supplied to it, the coil circuit having high alternating current impedance to reduce the flow of current when alternating current is supplied to the motor terminals.

6. A toy railroad having a track circuit formed by two rails, a locomotive propulsion motor having a field, an armature and reversing switch for controlling the direction of the movement of the locomotive, reversing switch operating means carried by the locomotive for selecting the direction according to the polarity of direct current supplied to the track circuit, a source of alternating current supply, a current rectifier connected to one side of the alternating current source, and a triple-blade, triple-throw switch connected to the track circuit and normally to the alternating current supply, the triple-throw switch having other positions on which it completes the rectifier circuit and connects the track circuit to the output terminals of the rectifier to supply direct current of selected polarity to the rails.

Signed at New York in the county of New York and State of New York this 24 day of August, 1931.

JOSEPH L. BONANNO.